US012810100B2

(12) United States Patent
Bell et al.

(10) Patent No.: US 12,810,100 B2
(45) Date of Patent: Nov. 24, 2026

(54) VARIABLE QR CODE PROCESSING PROVIDING CUSTOMIZED OUTPUT

(71) Applicant: BluVue L.P., Dallas, TX (US)

(72) Inventors: Win Bell, Dallas, TX (US); Brent McFerrin, Wesley Chapel, FL (US); Aaron Nadler, Leesburg, VA (US); Brad Seay, Frisco, TX (US)

(73) Assignee: BluVue L.P., Dallas, TX (US)

( * ) Notice: Subject to any disclaimer, the term of this patent is extended or adjusted under 35 U.S.C. 154(b) by 0 days.

(21) Appl. No.: 19/059,831

(22) Filed: Feb. 21, 2025

(65) Prior Publication Data

US 2025/0272529 A1 Aug. 28, 2025

Related U.S. Application Data

(60) Provisional application No. 63/556,651, filed on Feb. 22, 2024.

(51) Int. Cl.
*G06K 19/06* (2006.01)
*G06F 21/31* (2013.01)

(52) U.S. Cl.
CPC ....... *G06K 19/06037* (2013.01); *G06F 21/31* (2013.01)

(58) Field of Classification Search
CPC ...................... G06K 7/1417; G06K 19/06037; G06F 21/31; G06F 16/9554
See application file for complete search history.

(56) References Cited

U.S. PATENT DOCUMENTS

| | | | | |
|---|---|---|---|---|
| 2017/0063864 | A1* | 3/2017 | Williams ............. | G06K 7/1417 |
| 2019/0108430 | A1 | 4/2019 | Coppedge | |
| 2022/0383059 | A1 | 12/2022 | Sanderson et al. | |
| 2023/0067835 | A1* | 3/2023 | Daugherty ....... | G06K 19/06037 |

FOREIGN PATENT DOCUMENTS

| | | | | |
|---|---|---|---|---|
| WO | WO-2024194700 A1 * | 9/2024 | ........... | H04L 63/102 |

* cited by examiner

*Primary Examiner* — Laura A Gudorf

(74) *Attorney, Agent, or Firm* — Stephen Y. Liu; Carstens, Allen & Gourley, LLP

(57) ABSTRACT

Apparatus and method for QR code processing. In an exemplary method, a data string derived from a QR code is obtained, the QR code selected by a user operating the mobile device. A determination is made as to whether the data string has been previously assigned to a custom output. The user is provided with either the custom output based on permissions of the user or an option to reassign the data string to a new custom output in response to determining that the data string has been previously assigned to the custom output, and the user is prompted to associate the data string with one or more custom outputs based on the permission and in response to determining that the data string has not been previously assigned to the custom output.

28 Claims, 13 Drawing Sheets

VARIABLE QR CODE PROCESSING PROVIDING CUSTOMIZED OUTPUT

CROSS-REFERENCE TO RELATED APPLICATIONS

This application claims priority to U.S. Provisional Application No. 63/556,651, filed on Feb. 22, 2024, which is hereby incorporated herein by reference in its entirety.

TECHNICAL FIELD

The present disclosure is generally related to QR codes, and more particularly to systems, apparatuses, and methods for managing one or more actions undertaken in response to scanning QR codes.

BACKGROUND

Quick response codes, commonly referred to as QR codes, are two-dimensional matrix barcodes. They can consist of colored squares, i.e., data modules, arranged in columns and rows to encode a message dataset. The message dataset can be used to perform an action, such as presenting information, launching a website, joining a WI-FI network, tracking inventory, etc.

The message dataset can also include, for example, position markers, alignment markers, timing patterns, quiet zones, version information, format information, and data and error correction modules, which allows an image processing device to decode the QR code. The image processing device can include an imaging device, such as a camera, and an application executing some form of error-correcting codes. Non-limiting examples of the image processing device can include smartphones or other types of mobile computing device.

There are a vast number of possible QR codes. The most recent versions of QR codes, for example, have 177 rows and 177 columns creating 31,329 data modules. It is impossible for a human to understand or analyze these data modules, and therefore QR codes must be read, scanned, or parsed by a machine. Further, a standalone camera cannot translate QR codes to computer readable data. Instead, QR code decoding occurs on a QR application. For example, the APPLE® IPHONE® camera has a predefined framework for handling QR code scanning. Similarly, most ANDROID® devices and dozens of online applications offer QR code scanning applications.

The specific application used to decode the QR code does not impact the output of a QR code scan. QR codes are standardized according to the Association for Automatic Identification and Mobility, Japanese Industrial Standards, the International Organization for Standardization, and the International Electrotechnical Commission. Thus, the output generated by a QR code scan is uniform across all devices. A QR code scanned on an APPLE device in North America, for example, will return the same output as the same QR code scanned on an ANDROID device in Europe.

QR codes can encode numeric and alphabetic characters, Kanji, Kana, Hiragana, binary, and control codes. This encoded information is referred to as a data string. Regardless of the format of a data string, the primary functionality of QR systems requires a computer application to read data strings as instructions to perform an action. Accordingly, there are standard formats for data strings. For example, a QR code may instruct an electronic device to send an SMS message, e.g., to achieve this effect, the data string should be structured as "sms: [number]: [subject]." QR applications accept similar structures for URLs, vCards, vCalendars, text, email addresses, phone numbers, SMS messages, WI-FI networks, geo-coordinates, and other actions.

SUMMARY

Novel aspects of the present disclosure are directed to a method for managing QR code processing on a mobile device, the method including the steps of obtaining a data string derived from a QR code, the QR code selected by a user operating the mobile device; determining whether the data string has been previously assigned to a custom output; providing the user with either the custom output based on permissions of the user or an option to reassign the data string to a new custom output in response to determining that the data string has been previously assigned to the custom output; and prompting the user to associate the data string with one or more custom outputs based on the permissions and in response to determining that the data string has not been previously assigned to the custom output. As used herein, the new custom output can be a different custom output, or can be an additional output provided along with the existing custom output.

Novel aspects of the present disclosure are also directed to a method for managing QR code processing on a computing device in communication with a mobile device, the method including the steps of receiving, from the mobile device, a unique identifier (UID) of a user; receiving, from the mobile device, a data string derived from a QR code; identifying permissions associated with the user, wherein the permissions are based on the UID; determining whether the data string has been previously assigned to a custom output; providing the mobile device with either the custom output based on permission of the user or an option to reassign the data string to a new custom output in response to determining that the data string has been previously assigned to the custom output; and receiving, from the mobile device, a selection associating the data string with one or more custom outputs in response to determining that the data string has not been previously assigned to the custom output.

Novel aspects of the present disclosure are also directed to an apparatus for use in managing QR code processing. The apparatus includes memory storing instructions, and a processor communicatively coupled to the memory, wherein the processor is configured to execute the instructions to: obtain a data string derived from a QR code, the QR code selected by a user operating the mobile device; determine whether the data string has been previously assigned to a custom output; provide the user with either the custom output based on permissions of the user or an option to reassign the data string to a new custom output in response to determining that the data string has been previously assigned to the custom output; and prompt the user to associate the data string with one or more custom outputs based on the permission and in response to determining that the data string has not been previously assigned to the custom output.

Novel aspects of the present disclosure are also directed to another apparatus for use in managing QR code processing. The apparatus includes memory storing instructions and a processor communicatively coupled to the memory, wherein the processor is configured to execute the instructions to: receive, from a mobile device, a unique identifier (UID) of a user; receive, from the mobile device, a data string derived from a QR code; identify permissions associated with the user, wherein the permissions are based on the UID; determine whether the data string has been previously assigned to a custom output; provide the mobile device with either the custom output based on permissions of the user or an option to reassign the data string to a new custom output in response to determining that the data string has been previously assigned to the custom output; and receive, from the mobile device, a selection associating the data string with one or more custom outputs in response to determining that the data string has not been previously assigned to the custom output.

Other aspects, embodiments and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the disclosed principles shown where illustration is not necessary to allow those of ordinary skill in the art to understand the principles disclosed herein.

BRIEF DESCRIPTION OF THE DRAWINGS

The novel features believed to be characteristic of the disclosed principles are set forth in the appended claims. The disclosed principles themselves, however, as well as a preferred mode of use, further objectives and advantages thereof, will be best understood by reference to the following detailed description of illustrative embodiments when read in conjunction with the accompanying figures, wherein:

DETAILED DESCRIPTION

Figure 1:
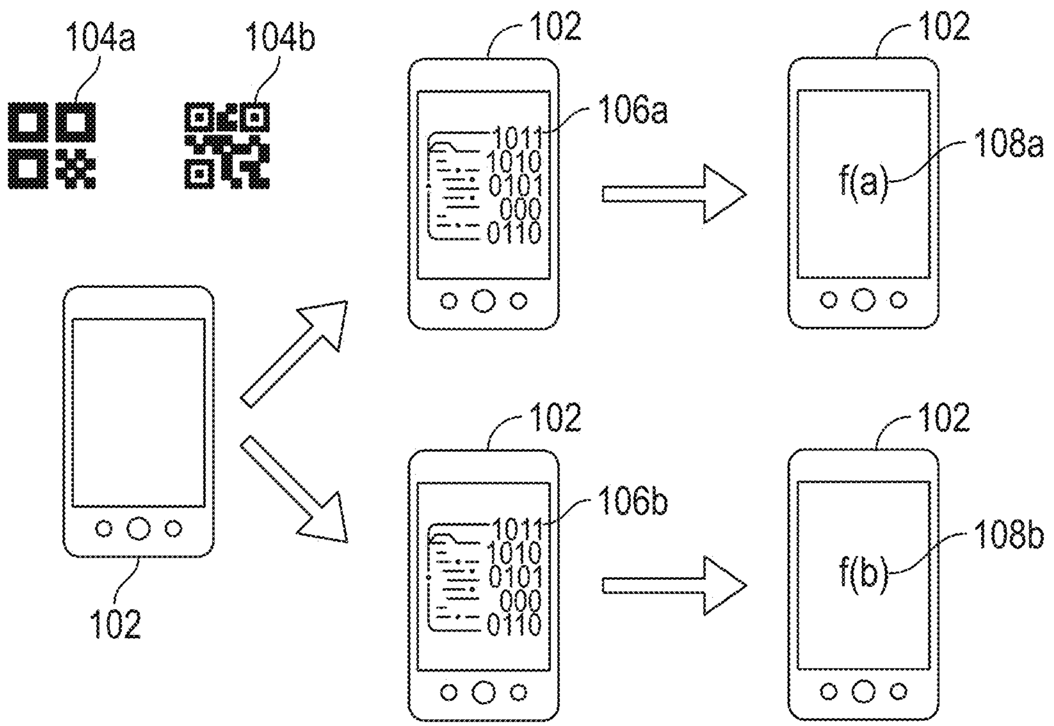
FIG. 1 depicts the conventional approach to processing QR codes.

According to the conventional approaches to QR code scanning and processing, the only party in control of QR code output is the original creator or publisher of the QR code. Neither users nor third parties enjoy the benefit of modifying, customizing, or categorizing QR codes and their output. Even dynamic QR codes, which allow the QR code creator to reassign the direction of a scan, offer no flexibility to a user.

URL codes comprise the most common data strings. URL output can be static or dynamic. Static codes direct a user to one location. Dynamic codes direct a user to query a server. Therefore, the output of a dynamic URL scan may be changed after the QR code is published. Even with the increased functionality of dynamic codes, QR code flexibility is heavily limited. An optimized approach to QR code handling allows for user and third-party customization to expand the scope of QR code uses.

Current applications wholly omit the ability for a user to reassign QR code output and redirect a device that has scanned the code. But there are many instances where that functionality is desirable. For example, in construction zones one piece of machinery may have dozens of QR codes affixed thereon to satisfy various job requirements. A tractor, in this instance, might be affixed with separate QR codes for service contacts, maintenance logs, fuel records, daily calendar tasks, safety precautions, incident reporting, and time tracking. It is inefficient to ask a user to scan multiple QR codes. A desirable approach would allow the user to reassign the app or action, i.e., the output, of each QR code to one library, such that every QR code directs to the same secondary location. The disclosed principles provide for an application that provides user control over QR code output.

In other instances, it may be desirable for a separate party to exercise some control over QR code output. In working environments, employees often have different roles, and it may be aesthetically undesirable, impossible due to special limitations, or plainly inefficient and confusing to have multiple QR codes in one location to be used by different employees. Repeating the earlier example of a construction site, it may be desirable for a maintenance worker and a manager to receive different results from scanning the same QR code that is located on a worksite checklist. Current embodiments of QR codes neglect the increased functionality of a credentialed system for QR code handling.

Novel aspects of the disclosed principles recognize the need to customize the output of a QR code scan. Such a benefit allows users and third parties to maximize the scope of QR code uses beyond what was anticipated by a QR code creator.

At least some of the novel aspects of the present disclosure are directed to a novel QR code management app that is configured to allow a user to scan any QR code or barcode and define their own associated app and/or action, i.e., custom output. The custom output can be used to easily open an app or proceed to a website, and when supported, dive deep into an app with deep linking to perform a specific action. Once the association is made, all future scans of that code from within the QR code management app will present the user with the option to use the custom output. A single code can be associated with many different custom outputs from which the user can choose to complete their task. As a result, a single QR code can be used to launch all equipment related apps. The QR code management app saves time and money by not requiring every machine to be tagged with a QR code for every applicable app. Additionally, users are no longer required to figure out what the right QR code is to scan on a machine with many QR codes for different apps.

FIG. 1 depicts the conventional approach to processing QR codes. A user with a mobile device 102 scans a QR code 104*a*, 104*b*. The mobile device 102 utilizes an application to translate the QR codes 104*a*, 104*b* to respective data strings 106*a*, 106*b*. The mobile device 102 recognizes the data strings 106*a*, 106*b* as instructions to cause the mobile device 102 to produce a predetermined output 108*a*, 108*b* that the user 102 cannot alter. As a result, the user is required to scan the corresponding distinct QR code 104*a*, 104*b* to obtain the desired output 108*a* and/or 108*b*.

Figure 2:
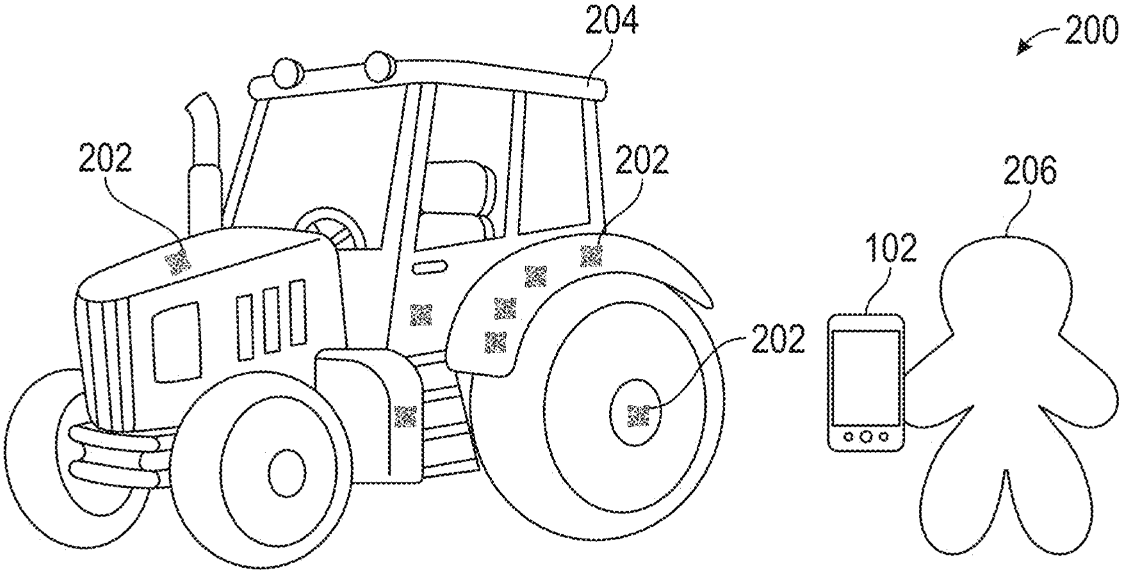
FIG. 2 depicts a construction environment implementing the conventional approach to processing QR codes.

FIG. 2 depicts a construction environment implementing the conventional approach to processing QR codes. In an exemplary construction environment 200, a plurality of unique QR codes 202 is affixed to a tractor 204. Each of the QR codes 202 is associated with a predefined output for the use and maintenance of the tractor 204. For example, a user 206 operating a mobile device 102 attempting to obtain the maintenance records of the tractor 204 generally scans each of the QR codes 202 in turn until the maintenance QR code is found. At least some of the novel aspects of the present disclosure allows the user to scan a single QR code that, once scanned by a QR code management app described in the present disclosure, can direct the user to a list of custom outputs, i.e., one or more supported apps and/or actions, based on the user's permissions.

Figure 3:
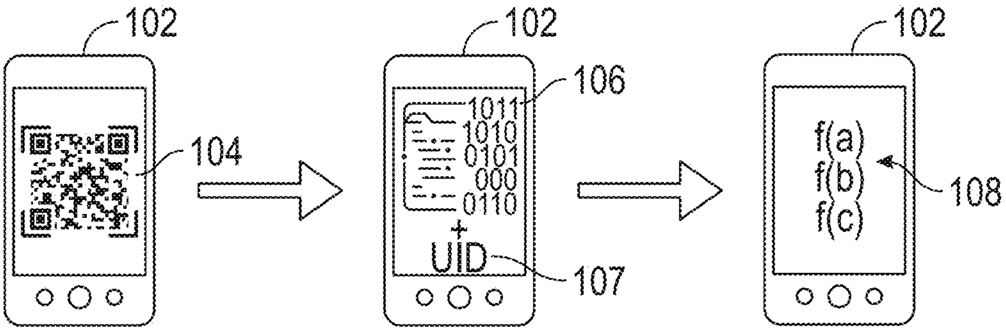
FIG. 3 depicts one aspect of the novel approach to processing QR codes according to an illustrative embodiment.

FIG. 3 depicts one aspect of the novel approach to processing QR codes according to an illustrative embodiment. A user operating mobile device 102 can scan a QR code 104 that is subsequently processed, at least in part, by a QR code management app running on the mobile device 102. The QR code management app can generate a data string 106 from the scan of the QR code 104 and associate the data string 106 with the user's unique identifier (UID) 107. Based on the data string 106 and the UID 107, the user can be presented with customized output 108. For example, returning back to the construction environment example of FIG. 2, the user can be presented with a list of acceptable apps and/or actions from which the user can select.

The customized output 108 can be determined locally on the mobile device 102, on a remote computing device that is communicatively coupled to the mobile device 102 via a network, or determined jointly by the mobile device 102 and the remote computing device. In any event, rather than immediately launching the app and/or action encoded by the data string 106, a determination is made as to whether the data string 106 has been previously associated with a custom output 108. The determination can be made with reference to one or more data structures stored in a database that is in turn stored in memory local or remote to the mobile computing device 102. If the data string 106 is not associated with a custom output 108 in the database, the user can be prompted to assign one or more custom outputs to the data string 106. In some instances, the user can be prompted to assign one or more custom outputs to the data string 106 even if the data string 106 is associated with a custom output 108. As an example, the prompt can be provided to the user as an interactive element in a user interface, like an icon or menu item.

The UID 107 can be the user's credentialed login information, such as an alphanumeric username and password, or biometric identifying information, pin entry, multi-factor authentication, and the like. The UID 107 can also be unique information identifying the mobile device 102, such as the device's International Mobile Equipment Identity (IMEI) number, MAC address, and the like. The UID 107 can be manually entered by the user or automatically populated by the mobile device 102 upon launch of the QR code management app.

Each user's associated unique identifier can be associated with different permissions that impact the custom output(s) 108 returned to the user on the mobile device 102. Thus, different users scanning the same QR code 104 can be provided with different custom outputs 108 on their respective mobile devices. In a non-limiting embodiment, each of the users can be assigned to one of three top level groups, e.g., standard user, power user, and admin user, each of which is associated with different permissions. In some embodiments, one or more of the top level groups can be broken down further into one or more subgroups.

A standard user has permission to launch a QR code management app for scanning QR codes and to cause the QR code management app to provide one or more predefined, custom outputs. A power user can use the QR code management app the same way as a standard user but can also use the QR code management app to define new custom outputs for a scanned QR code.

A user, either a standard user or a power user, can use the QR code management app for infield app association. For example, the user can see a list of apps that can be associated with a QR code that is scanned in the field. In a particular embodiment, scanning an associated code from within the app presents the user with a list of apps that they can use. The user can interact with a link dialog that helps the user connect to the selected app and action if available to the scanned code. The user can choose to set an expiration for the code association, when available, based on the selected app. The app would always be shown with the possibility of adding more associations if it has actions that are unused. In some embodiments, existing associations can be redefined so that an action can be reused, but with different parameters.

The user can make infield associations with a QR code scan. For example, as a user, a scan of a QR code from the app can provide a list of apps or actions that have been associated with the code to allow the user to quickly jump into a desired action or app. Scanning the code presents the user with a list of apps that are associated with the code that they have permission to access. Apps can be grouped as defined below in the navigation section.

A user can also use the application to search apps. The user can be provided with the ability to search the apps that are available so that the user can quickly find an app even if it isn't one that is used regularly. The user can type in a search bar and a list of apps can be filtered based on the text they enter. Search results can be pre-filtered to only include valid potential associations if the QR code management app knows that a QR code is associated with a particular app and/or action, e.g., based on other associations.

The user can also be provided with navigation features. The user can manipulate the QR code management application to organize the apps to make it easy to find and access the most commonly used apps. For example, an app or an app plus action can be marked as a favorite and all the favorite apps can be grouped together for easy access. The user can also be provided with a screen or a list of Apps that are organized from most to least used. The user can also be provided with a screen or a list showing all apps that the user has access to.

The user can also create temporary associations between a QR code and an app or an action so that the user can leverage existing QR codes on items that they do not have control over. For example the user can set the number of hours the association is valid for, as an example the default can be 8 hours. The QR code management app can remember the user's last selection for duration and use that as a default for future durations. The user can also use the QR code management app to generate temporary QR codes. The user can be provided with the ability to generate a new QR code on the fly to be used with temporary associations where there is a human on the other side receiving the new QR code. For example, in a process such as tracking dump truck cycles, if a subcontractor driver does not have a QR code with them or on the vehicle, the user can generate a temporary QR code on the fly that the driver can use. There are multiple ways to deliver the QR code such as, multimedia messaging service (MMS), rich communication services (RCS), e-mail, scanned by user and used to open a browser within the code, or photographed and stored in the devices gallery for future scans. Alternatively, if the subcontractor driver does have possession of a QR code, like a QR code from a takeout menu, the driver can use the QR code as their daily code, e.g., to allow them to check into both ends of a haul operation. The QR code management app can confirm that the QR code is unique, associate the code with the driver and an action (e.g., checking in) and then pass that association to any app that is designed to track and manage trucking cycles.

An admin user can have a number of different managerial responsibilities. For example, the admin user can be responsible for user management, e.g., creating, deleting, and updating users as well as controlling the users' level of access to the system. Admin user management responsibilities can also include the assignment of users to one or more top level groups and/or subgroups, each of which may have access to different user permissions. Implementation of subgroups allows for more granular control of the QR code management app and the custom outputs defined therein. For example, users can be assigned to groups based on the types of actions that the user can perform. A first subgroup of standard users may be granted access to three custom outputs based on a scan of a QR code whereas a second subgroup of standard users may be granted access to three separate custom outputs based on the scan of the same QR code.

The admin can also be responsible for application association management. For example, the admin can define the list of possible apps that users will be able to use so power users can define their own custom output(s), i.e., associations with those apps. The admin can add, remove, and update company identifiers for third-party apps that have APIs and can support deep linking.

The admin can also be responsible for scan code management. For example the admin can set up the associations between the codes and the actions undertaken in response to scanning the codes so that the users do not have to each manually create all of the associations. For example the admin can manually create associations in the app, or programmatically create associations. The admin can make associations between existing IDs in the app and registered third-party apps, via APIs or CSV upload.

The admin can also be responsible for deep link management. The admin can programmatically link QR codes to 3rd party IDs to rapidly deploy new systems. For example, the interface can allow the admin to make associations between existing IDs and the QR code management app and third-party apps.

Figure 4:
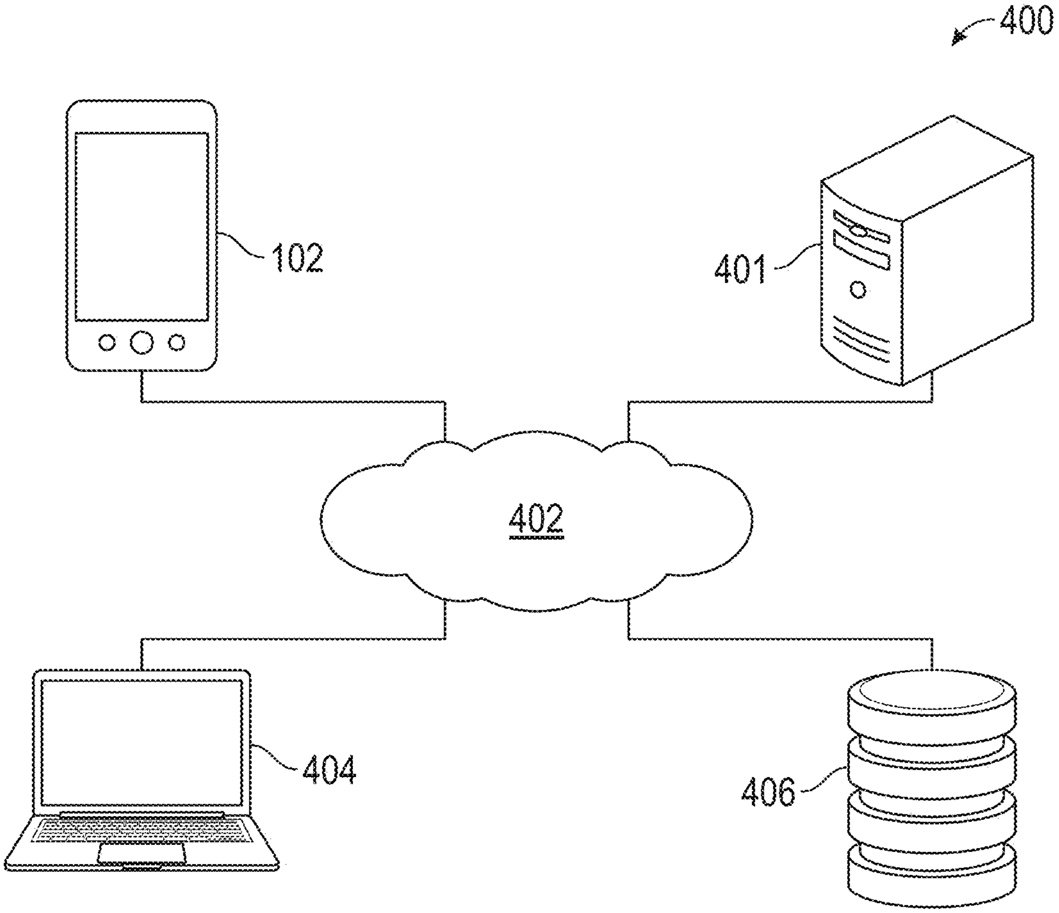
FIG. 4 is a simplified block diagram of a system for processing QR codes according to an illustrative embodiment.

FIG. 4 is a simplified block diagram of a system for processing QR codes according to an illustrative embodiment. The electronic device 102, which is shown in more detail in FIG. 5, can include a QR code management app 505 for managing the processing of QR code 104.

The QR code management app 505 can be a distributed application executing on more than one computing device, but which communicates via network 402. For example, QR code management app 505 can be two separate software programs, with the back end software executing on the server 401 and the front end software executing on the mobile device 102. In another embodiment, the QR code management app 505 is a single software application that can be accessed by multiple distributed computing devices with different permissions granted to different users based on the user type, e.g., standard user vs. power user vs. admin.

After scanning a QR code, such as QR code 104, the QR code management application 505 causes the electronic device 102 to transmit information obtained from, or related to, the QR code 104, such as an extracted data string, across a communications network 402 to a server 401. The network 402 may be any type of communications network, such as a private wired or wireless network or a publicly accessible network like the internet. In some embodiments, the server 401 has data storage capabilities, while in other embodiments the server 401 is in communication with one or more data stores, such as storage device 406. In an exemplary embodiment, the storage device 406 may comprise one or more data structures, e.g., data tables, that store information that can be used to determine user type based on the user's login credentials and also determining one or more customized outputs based on the data string 106, the user type and/or permissions.

The server 401 receives the data string 106 from the electronic device 102 as input and utilizes the data structures in the storage device 406 to determine the predefined computer readable instructions to return to the electronic device 102 based on the application executing on the device 102 and/or based on the user's login credentials provided during scanning of the QR code 104. In some cases, the computer readable instructions returned to the electronic device 102 may instruct the electronic device 102 to assign an action to a novel data string (i.e., the data string of a QR code that has not been previously scanned and, therefore, is not defined as a customized output).

In an exemplary embodiment, the system 400 includes an administrator device 404 communicatively coupled to the network 402. The administrator device 404 may access the data structures stored in the storage device 406 directly or via an intermediate device, such as server 401, for fulfilling administrative responsibilities, as previously described. The administrator device 404 may be used to set actions responsive to specific data strings, accounts, other stored information, or any combination thereof. The administrator device 404 may dictate the response an electronic device 102 ultimately receives after scanning a QR code 104.

Figure 5:
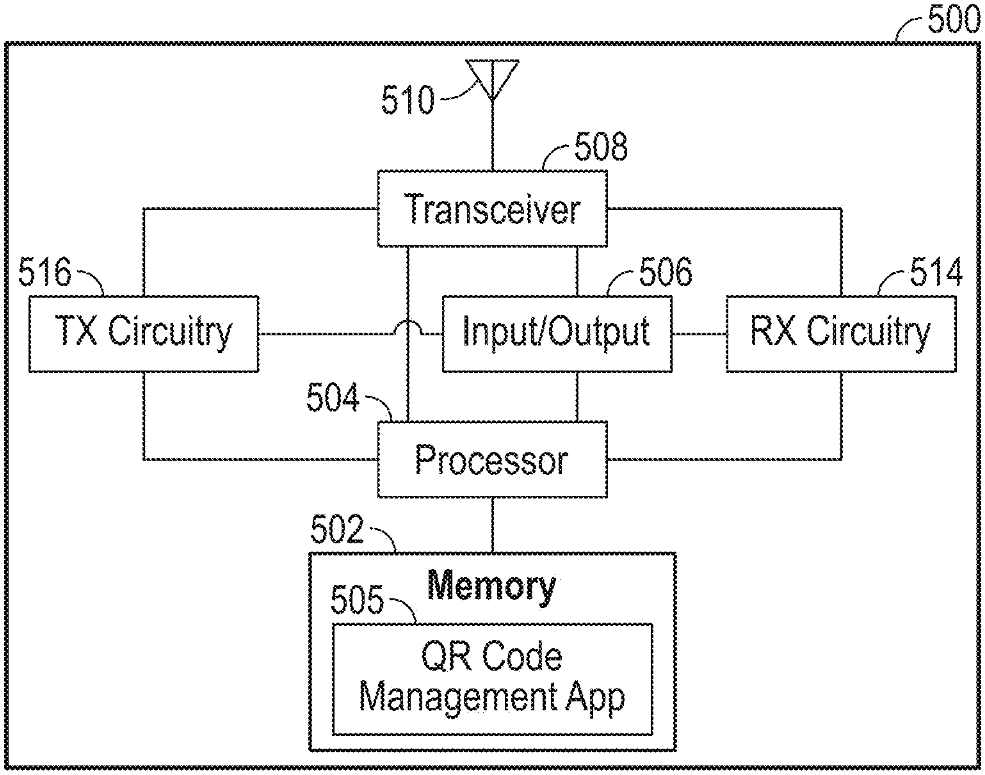
FIG. 5 is a simplified block diagram of a mobile computing device for use in processing QR codes according to an illustrative embodiment.

FIG. 5 is a simplified block diagram of a mobile device for use in processing QR codes according to an illustrative embodiment. The mobile device 500 is provided for illustration only. The mobile device 102 in FIGS. 1, 2, 3, and 4 and/or the administrator device 404 in FIG. 4 can have the same or similar configuration as the mobile device 500 in FIG. 5.

Mobile device 500 includes memory 502 storing instructions that can be executed by processor 504 for controlling the operation of the mobile device 500. For example, the memory can store an operating system and one or more applications that can be executed by the processor 504, such as QR code management application 505. The memory 502 can include random access memory (RAM), Flash memory, and/or read-only memory (ROM).

I/O 506 is one or more input/output (I/O) devices of the mobile device 500. Examples of I/O devices include, but are not limited to, a microphone, a speaker, a camera, a touch screen, a keypad. I/O 506 enables a user to interact with the mobile device 500 to scan one or more QR codes and interact with a QR code management app 505 as described herein, e.g., assigning and/or receiving customized output. In some embodiments, I/O 506 also includes I/O interfaces that provide the mobile device 500 with communications paths with other devices, such as other mobile devices and peripherals.

The transceiver 508 provides a wireless communications capability with a network, such as network 402 in FIG. 4. Incoming signals are received by the transceiver 508 from the antenna 510 and processed by the receive (RX) circuitry 514, which processes the signal and transmits the processed signal to an I/O device, such as a speaker, if the processed signal is for voice data. The processed signal can also be transmitted to the processor 504 for further processing before presentation to a user on another I/O device, such as a screen, if the processed signal is for other forms of data, such as web browsing data. Outgoing signals, which can include voice data from a microphone or other forms of outgoing data, such as web data, e-mail, or application data from the processor 502, can be passed from the TX circuitry 516 to the transceiver 508 before being transmitted through the antenna 510.

The mobile device 500 in FIG. 5 is depicted as a mobile phone, but the mobile device 500 can be any other conventional client computing devices such as tablets, laptop computers, and desktop computers. For example, the transceiver depicted in the mobile device 500 can be replaced by a network communications interface that can support wired or wireless communication over a user's home network.

Figure 6:
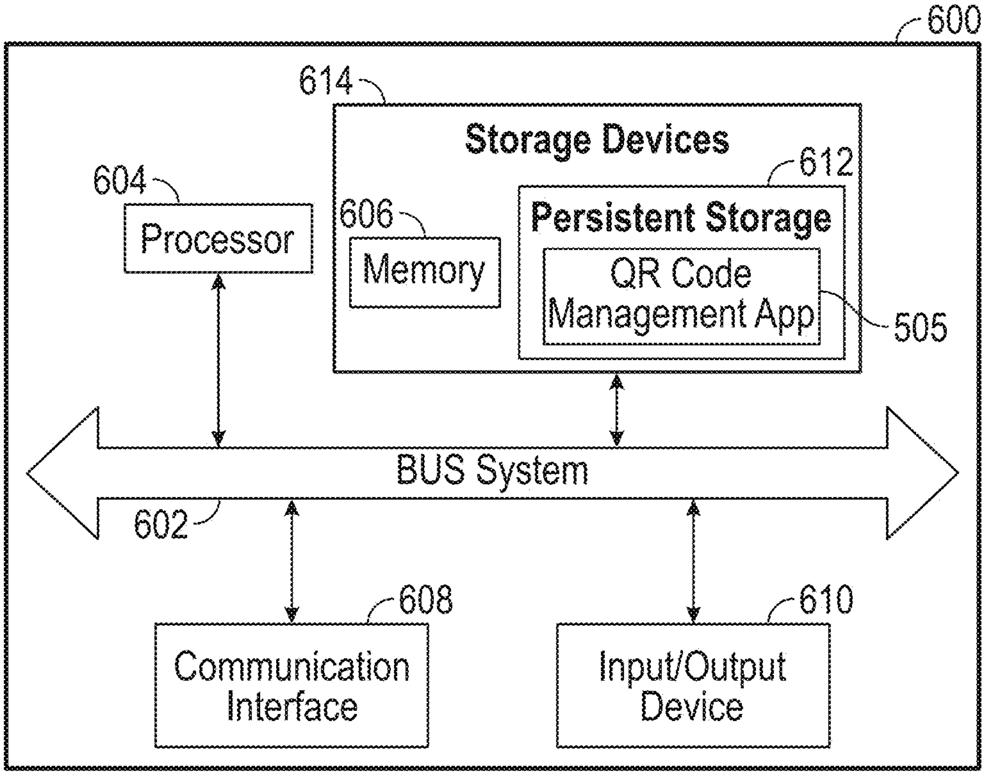
FIG. 6 is a block diagram of a computing device for use in processing QR codes according to an illustrative embodiment.

FIG. 6 is a block diagram of a computing device for use in processing QR codes according to an illustrative embodiment. In one or more embodiments, the computing device 600 can be a server, such as server 401, which includes a bus system 602 that supports communication between at least one processor 604, at least one storage device 614, at least one communications interface 608, and at least one input/output (I/O) unit 610.

The memory 606 and a persistent storage 612 are examples of storage devices 614, which represent any structure(s) capable of storing and facilitating retrieval of information (such as data, program code, and/or other suitable information on a temporary or permanent basis). The memory 606 may represent a random-access memory or any other suitable volatile or non-volatile storage device(s). The persistent storage 612 may contain one or more components or devices supporting longer-term storage of data, such as a read only memory, hard drive, Flash memory, or optical disc.

The processor 604 may execute instructions that may be loaded into the memory 606. The processor 604 may include any suitable number(s) and type(s) of processors or other devices in any suitable arrangement. Example types of processors 604 include microprocessors, microcontrollers, digital signal processors, field programmable gate arrays, application specific integrated circuits, and discreet circuitry.

The communications interface 608 may support communications with other systems or devices. For example, the communications interface 608 could include a network interface card or a wireless transceiver facilitating communications over the network 402. The communications interface 608 may support communications through any suitable physical or wireless communication link(s).

The I/O unit 610 may allow for input and output of data. For example, the I/O unit 610 may provide a connection for user input through a keyboard, mouse, keypad, touchscreen, or other suitable input device. The I/O unit 610 may also send output to a display, printer, or other suitable output device.

As described in more detail below, the server 600 can be implemented as a part of a system 400 for managing QR code processing. For example, the server 600 can host a QR code management application 505 for managing the actions/functions of QR codes in the field. In addition or in the alterative, the server 600 can host one or more data structures for managing QR code processing, or provide a client device 102 with access to the data structures if hosted locally to the server 600 or stored in a remote storage device 406. In some embodiments, an admin can interact directly with the server 600 for managing the actions/functions associated with QR codes in the absence of a dedicated administrator device 404.

Exemplary QR Code Management App

FIGS. 7-14B are a series of exemplary illustrations depicting screens for a QR code management application according to an illustrative embodiment. The various screens can be presented to a user operating a mobile computing device, such as mobile device 102.

Figure 7:
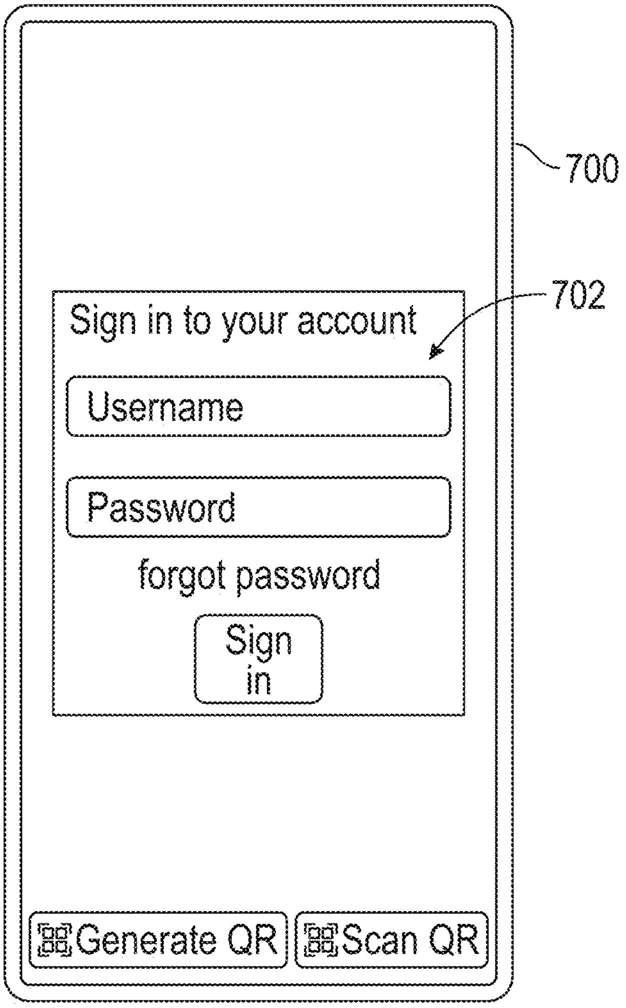
FIG. 7 is an exemplary screen presented to a user for logging into a QR code management app usable in processing QR codes according to an illustrative embodiment.

FIG. 7 is an illustration of a login screen presented to a user according to an illustrative embodiment. The login screen 700 prompts a user to provide a username and password into the corresponding text fields 702. The username and password combination is a unique identifier that identifies each user of the QR code management application 505. Once the user is identified, the user can interact with the QR code management app 505 on a mobile device to perform various processes, such as finding and linking apps that the user has permission to use, associating third-party QR codes with apps that the user has permission to use, generating temporary electronic QR codes, launching one or more apps with native QR codes that have been previously associated with an app available through the QR code management app 505, or making new associations with native QR codes and apps available through the QR code management app 505. Some of these various use cases are described in detail below.

Exemplary Use Case 1

FIGS. 8A-8F depict a series of screens illustrating a user's interaction with the QR code management app 505 in accordance with an illustrative embodiment. The screens 800*a*-800*f*, referred to collectively as screens 800, can be presented to a user operating a mobile device, such as mobile device 102, while accessing the QR code management app 505 for the first time (or during initial set up). The user in this example has access to company-added apps.

Figure 8A:
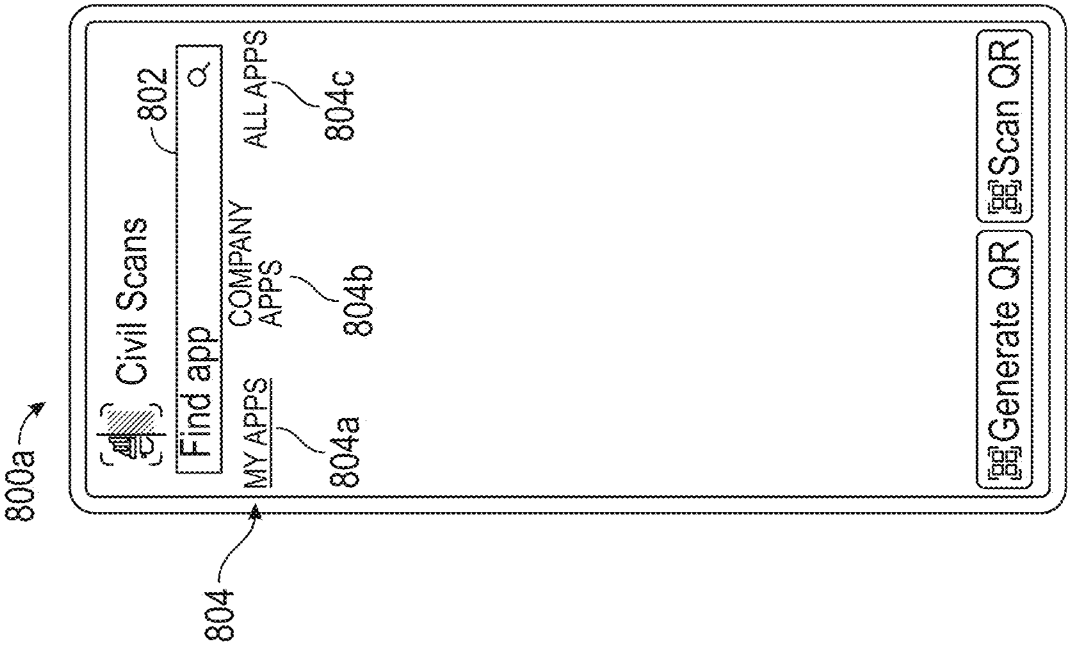
FIGS. 8A-8F are a series of exemplary screens depicting user interaction with a QR code management app for processing QR codes according to an illustrative embodiment.

The first screen 800*a* shown in FIG. 8A depicts an exemplary landing page for the QR code management app 505. The screen 800*a* includes a search bar 802 can be provided that allows a user to find an app by name. Alternatively, apps can be located by navigating to one of the menu items 804*a*-804*c*, collectively 804, in the menu bar. In this illustrative embodiment, the menu bar includes a first menu item 804*a* named "MY APPS", a second menu item 804*b* named "COMPANY APPS", and a third menu item 804*c* named "ALL APPS". In this illustrative embodiment, the landing page defaults to the MY APPS page. An exemplary COMPANY APPS page is shown in FIG. 8B and an exemplary ALL APPS page is shown in FIG. 8D.

The MY APPS page shown on screen 800*a* shows the apps that the user has added to their list or that have been assigned to them by the company admin and pre-populated onto the MY APPS page. If no apps have been pre-populated into the MY APPS page, then a message can be presented to the user such as "No Linked Apps". The message may also prompt the user to add an app via the COMPANY APPS link or the ALL APPS link in the menu bar, or to reach out to an admin to get access to the apps appropriate to their role.

Selection of the second menu item 804*b* from screen 800*a* navigates the user to the COMPANY APPS page that shows all the apps the company admin has added/approved for the user's use within the company. The user can select any one of the app icons 806 presented on the screen 800*b*, such as app icons 806*a*, 806*b*, or 806*c* for adding to the MY APPS page. As an example, selecting the app icon 806*a* launches a window 808, as can be seen in screen 800*c* in FIG. 8C which confirms the user's intent to add the app to the MY APPS page. The window 808 can include relevant identifying information for the associated app. Pressing the ADD button in the window 808 populates the app icon 806*a* into the MY APPS page, as shown on screen 800*d* in FIG. 8D.

Figure 8B:
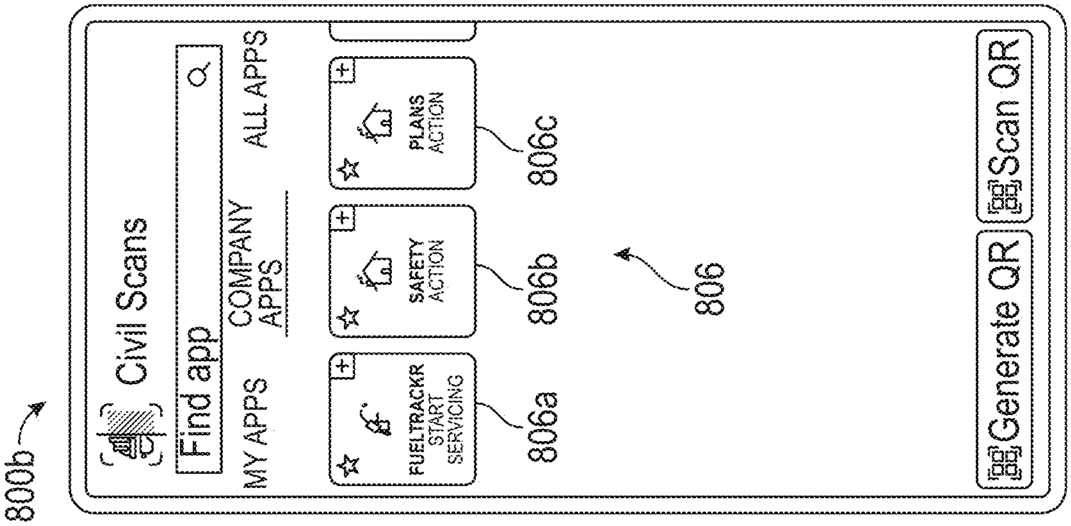
Figure 8C:
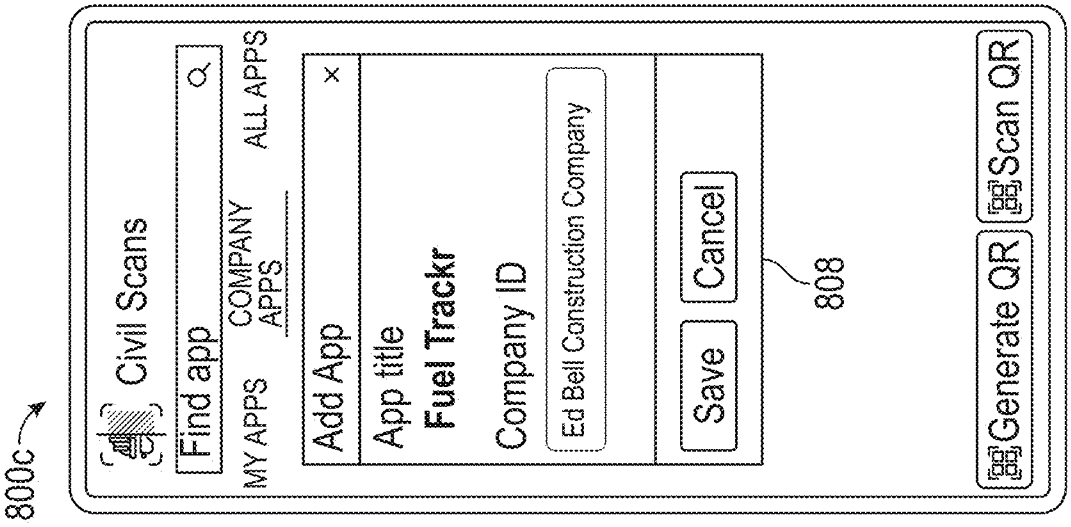
Figure 8D:
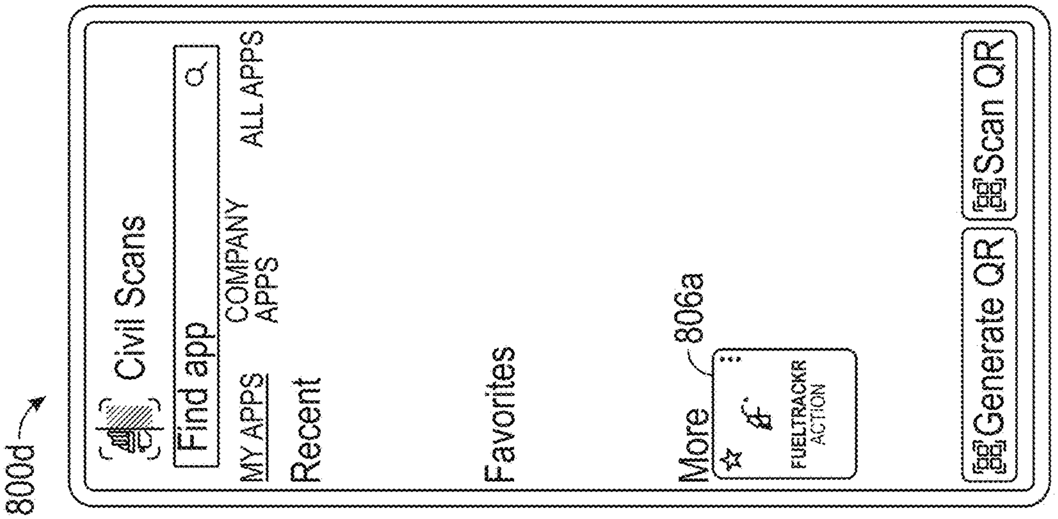

Each of the app icons 806 depicted on screen 800*b* in FIG. 8B identifies the app icon by a name, e.g., "FuelTrackr" for app icon 806*a*, "Safety" for app icon 806*b*, and "Plans" for app icon 806*c*. Beneath the name of the app icon is a descriptor based on an action that is deep linked to the app icon. App icon 806*a* is already pre-defined to launch the "Start Servicing" action of the FuelTrackr app. App icons 806*b* and 806*c* have the ability to be assigned to a deep link of their respective apps, but the deep link action has not yet been assigned. Accordingly, each of the app icons 806*b* and 806*c* display the generic "ACTION" descriptor to let a user know that a deep link association can be made. The plus mark in the upper right corner of the app icon indicates that a user can add the app icon to the MY APPS page. Once the app icon has been moved to the MY APPS page, as can be seen on screen 800*d* in FIG. 8D, the plus mark can be replaced by vertical ellipses to let the user know that an overflow menu can be accessed, and a star-shaped outline can be displayed to let the user know that the app icon can be favorited. If the user elects to favorite the app icon, then the star shaped outline can be filled in.

The app icons displayed on the MY APPS page of FIG. 8D can be arranged in one or more groups to make it easier for the user to locate apps. The "RECENT" grouping of apps includes app icons in order of most recently used apps. The app icons can be presented in a slidable list that can display as many app icons that can fit horizontally on the screen without clipping. The "FAVORITE" grouping of apps includes apps that the user has favorited, presented in alphabetical order. The "MORE" grouping of apps includes all apps the user has access to. App icon 806*a* is the first app icon added to the MY APPS page and shown in the MORE grouping of apps because the app has not yet been used, and thus not yet displayed in the RECENT grouping, and not yet favorited, and thus included in the FAVORITE grouping. Apps that have been moved to the MY APPS page App icon 806*a* can be favorited by highlighting the star at the upper left corner of the app icon.

Figure 8E:
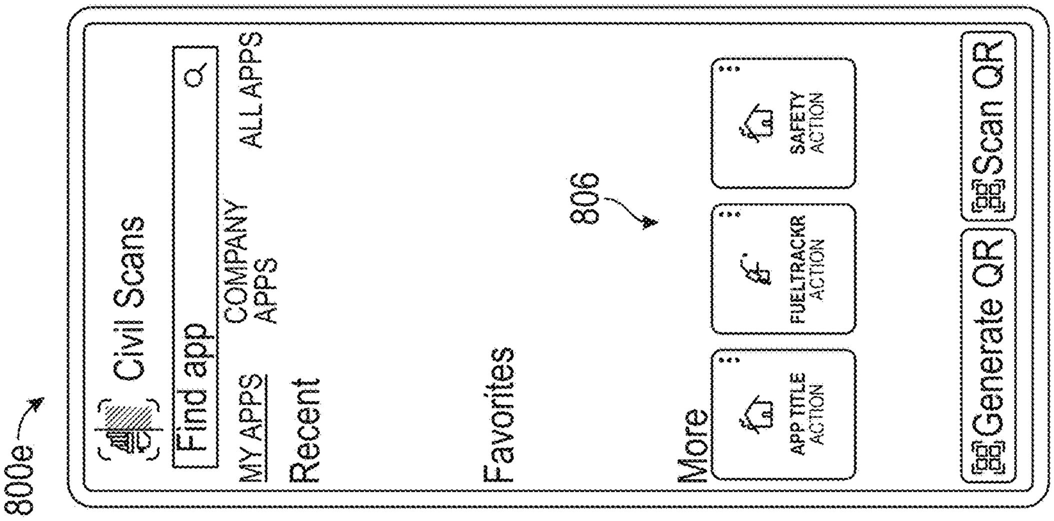
Figure 8F:
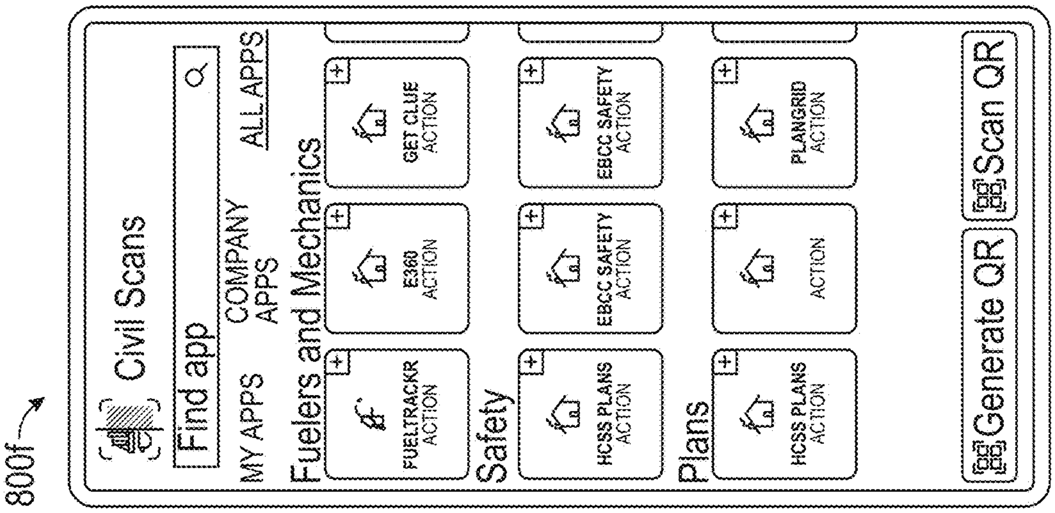

In some embodiment, an admin can pre-populate the MORE grouping of apps on the user's MY APPS page with the apps that the corresponding user has access to, as can be seen in screen 800*e* in FIG. 8E. As before, the user can also add more app icons to the MY APPS page shown in FIG. 8D by navigating to the ALL APPS page, as shown on screen 800*f* of FIG. 8F. The ALL APPS page can be an app store featuring all apps that have integrations with the QR code management app 505 and can be grouped by category, e.g., "FUELERS AND MECHANICS", "SAFETY", "PLANS", "POPULAR", "PROMOTED", etc.

Exemplary Use Case 2

Figure 9A:
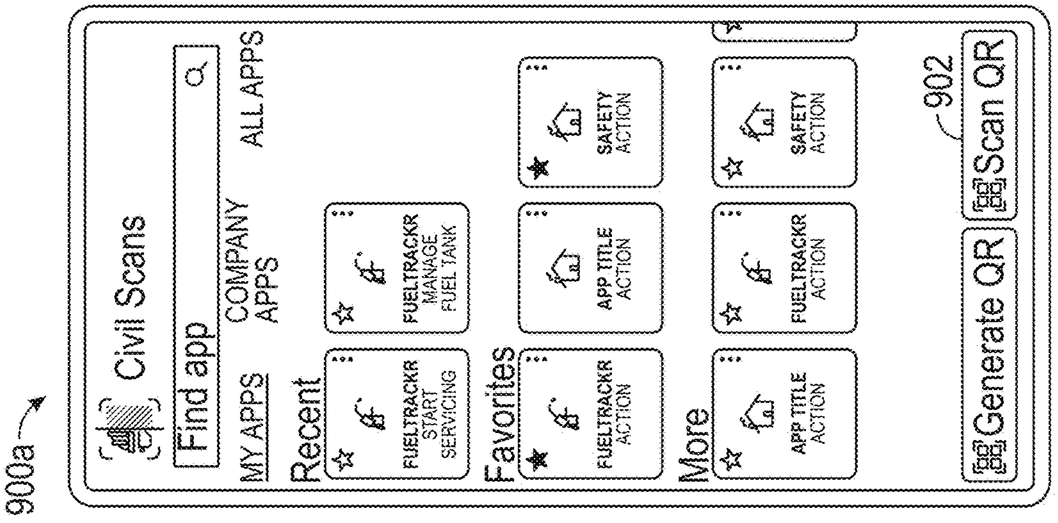
FIGS. 9A-9C are a series of exemplary screens depicting user interaction with a QR code management app for processing QR codes according to another illustrative embodiment.
Figure 9B:
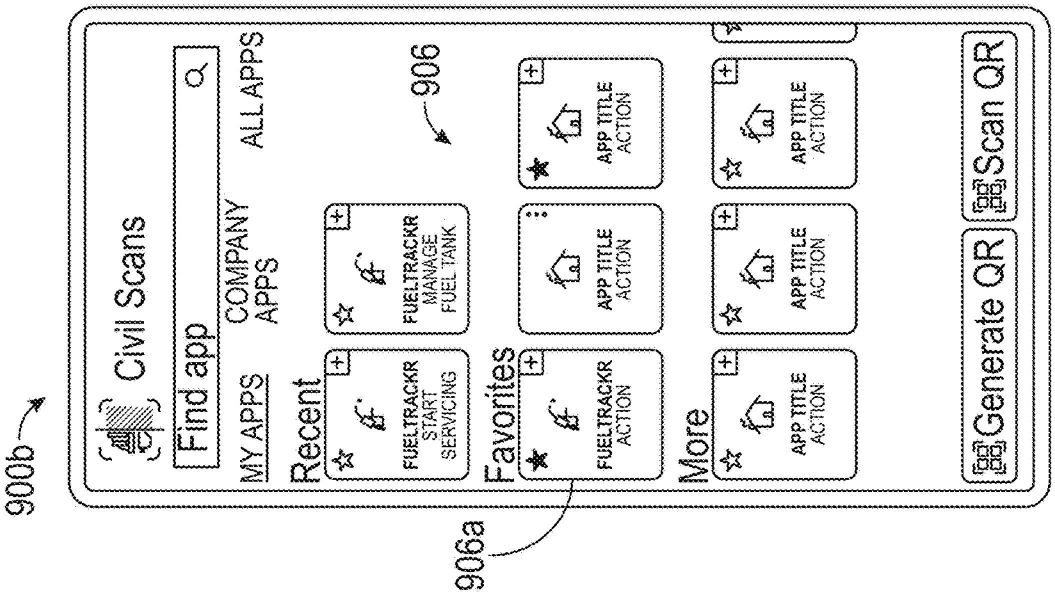
Figure 9C:
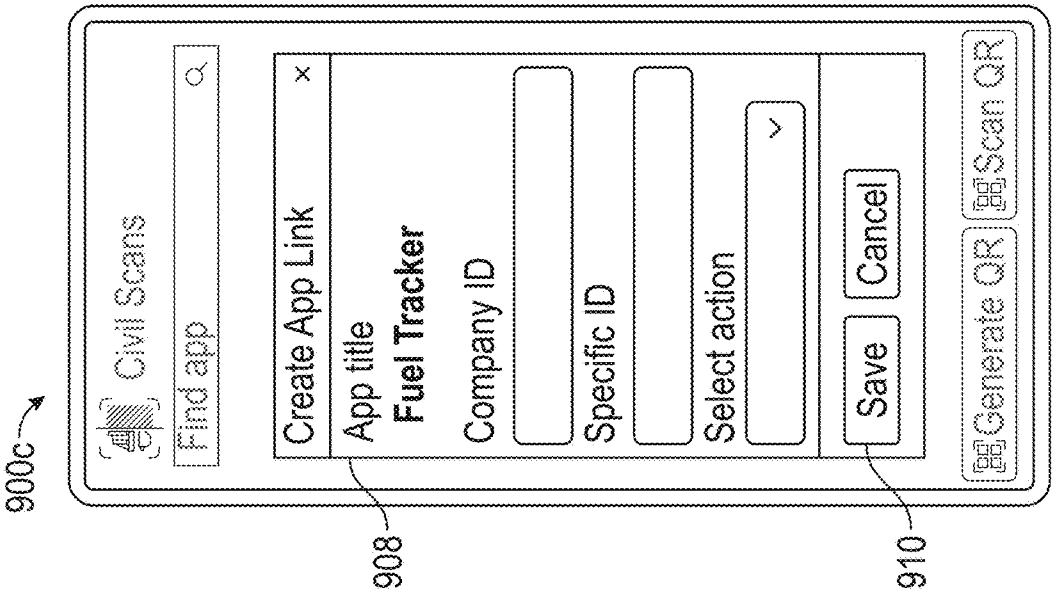

FIGS. 9A-9C depict a series of screens illustrating a user's interaction with the QR code management app 505 in accordance with another illustrative embodiment. In particular, screens 900*a*-900*c*, referred to collectively as screens 900, can be presented to a user while creating a permanent association between a previously unassociated, third-party QR code and an existing app available via the QR code management app 505. The QR code can be unique to that company and/or user group.

After logging into the QR code management app 505 through screen 700, the user is presented with the MY APPS page on screen 900*a*. The user can press the SCAN QR button 902 to enable the user to scan the third-party QR code. Once scanned, the QR code management app 505 can allow the user to create an association between the scanned QR code with any one of the apps managed by the QR code management app 505. In this illustrative example, the user is presented with screen 900*b* shown in FIG. 9B after scanning the third party QR code. Selection of icon 906*a* from the icons 906 launches a window 908, as can be seen in screen 900*c* in FIG. 9C which displays a confirmation dialog showing the details for the association that the user is about to make. The user can optionally define a deep link action if a default deep link action has not been defined. Pressing the SAVE button 910 in the window 908 associates the third-party QR code with the selected app, causing the QR code management app 505 to launch the selected app and pass data to the app, such as the ID and the user-selected deep link action.

Figure 10C:
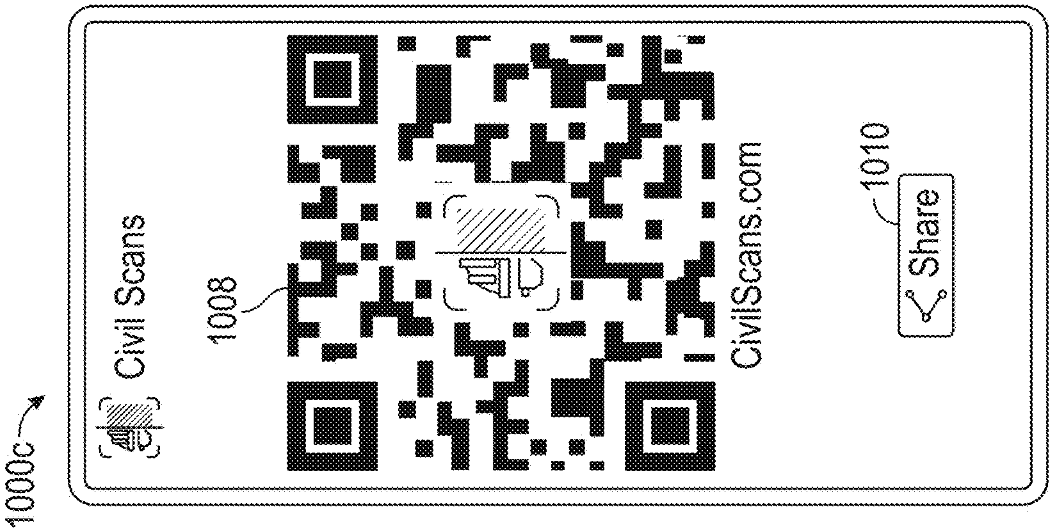
FIGS. 10A-10E are a series of exemplary screens depicting user interaction with a QR code management app for processing QR codes according to another illustrative embodiment.
Figure 10B:
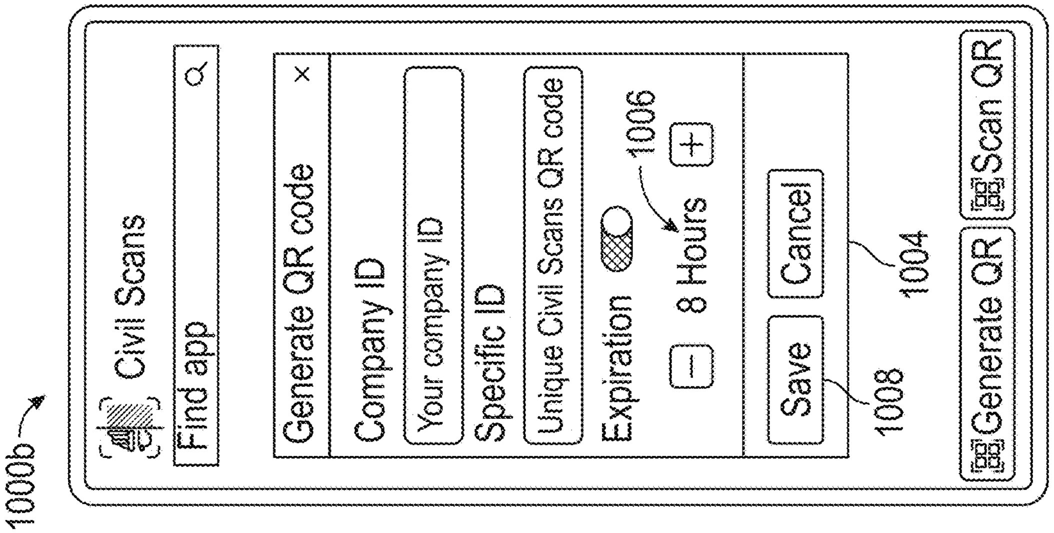

In some embodiments the association can be made temporary rather than permanent by setting a usage expiration timer, an example of which is shown in more detail in FIG. 10B, which allows the user to leverage existing QR codes on items that are not under the user's control. The usage expiration timer determines the number of hours for which the QR code is valid. In some embodiments the expiration timer can be set for a default time, e.g., 8 hours, but permit the user to adjust the time as needed. The usage expiration timer can then default to the last adjusted time for future usage.

Exemplary Use Case 3

FIGS. 10A-10E are a series of illustrations depicting a user's interaction with the QR code management app 505 in accordance with another illustrative embodiment. The screens 1000*a*-1000*e*, referred to collectively as screens

1000, can be presented to a user during the process of creating a QR code on the fly for interaction with a different user of another mobile device in the event that there are no other QR codes available to use, such as a takeout menu QR code. In this embodiment, the QR code management app 505 can be used to create a QR code on the fly, set an expiration timer for the generated QR code, and then share the QR code, e.g., by presenting the QR code on the screen for scanning or by any conventional sharing methods, such as MMS, or email.

Figure 10A:
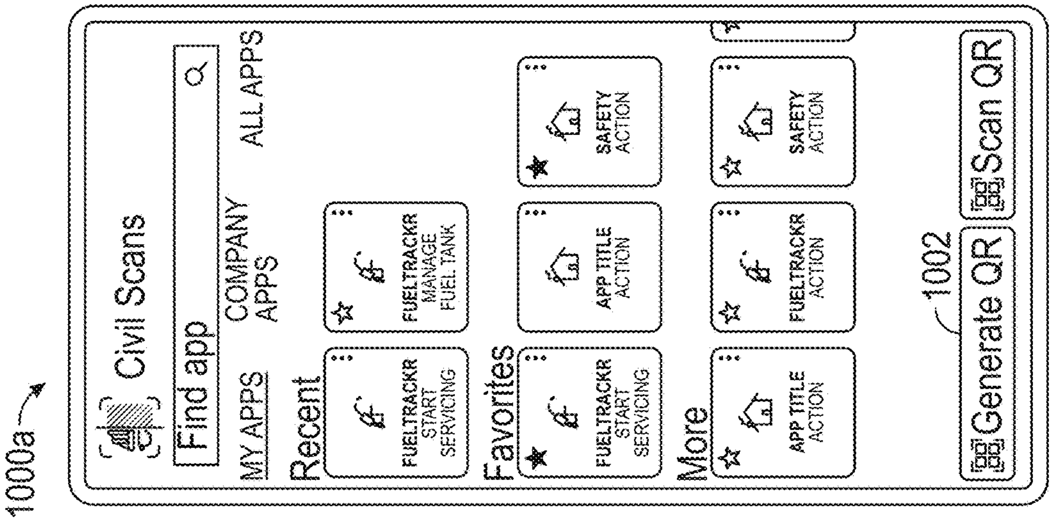
Figure 10D:

With reference now to the screen 1000*a* in FIG. 10A, the user creating the QR code on the fly is presented with the MY APPS page after logging into the QR code management app 505 through screen 700. Pressing the "Generate QR" button 1002 launches a confirmation window 1004, shown on screen 1000*b* in FIG. 10B, which can include pre-populated text fields and/or user fillable text fields identifying the QR code. The window 1004 can also allow the user to set an expiration timer 1006 that allows the user to set an expiration time for the QR code. The expiration timer 1006 can have a default value, such as 8 hours, but can be increased or decreased as needed. After pressing the "Save" button 1008, the QR code management app 505 can present the generated QR code 1008 on screen 1000*c* of FIG. 10C to allow another user of a different mobile device to scan the QR code 1008 to access the associated app and/or action. Alternatively, the QR code 1008 can be shared by pressing the "Share" button 1010 shown on screen 1000*c*, and selecting one of the sharing options, as shown on screen 1000*d* of FIG. 10*d*. In some embodiments, the QR code management app 505 can include a native sharing function.

Figure 10E:
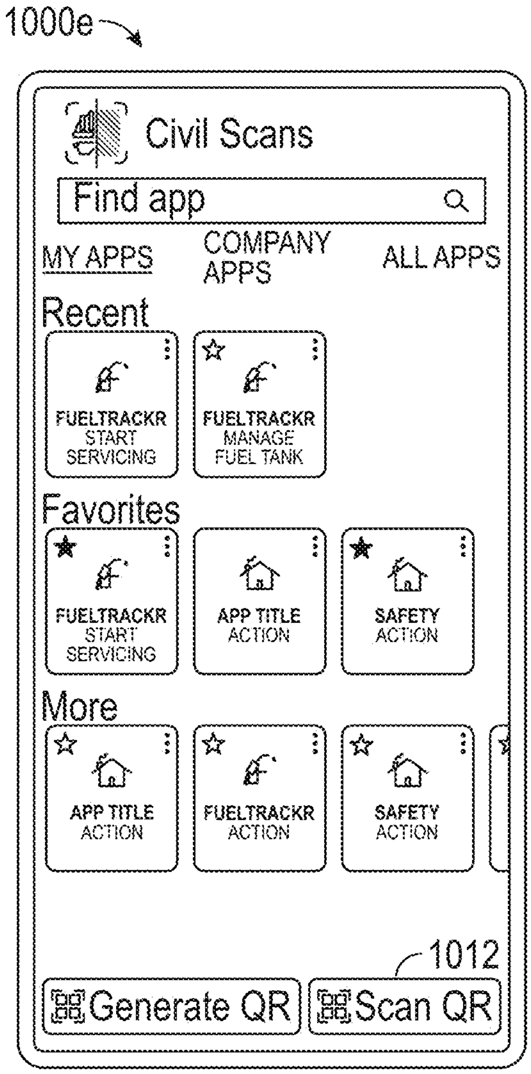

The user of a different mobile device can receive the QR code 1008 by logging into the QR code management app running on their mobile device and then by pressing the "Scan QR" button 1012 as shown in screen 1000*e* in FIG. 10E. The user of the different mobile device can scan the QR code 1008 as previously described. Alternatively, after pressing the "Scan QR" button 1012, the user can be presented with the option of taking a picture of the QR code 1008 for later access. Depending on how the QR code 1008 is shared, the user of the different mobile device can also receive the QR code 1008 by navigating to the location on the mobile device in which the one or more QR codes are stored, such as an MMS or e-mail program.

Exemplary Use Case 4

Figure 11:
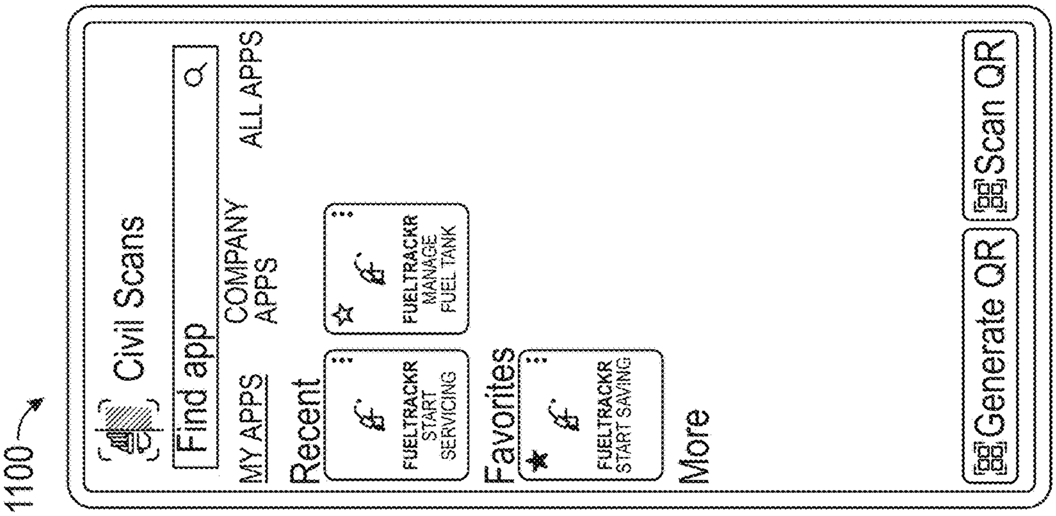
FIG. 11 is an exemplary screen depicting user interaction with a QR code management app for processing QR codes according to another illustrative embodiment.

FIG. 11 depicts an exemplary screen illustrating a user's interaction with the QR code management app 505 in accordance with an illustrative embodiment. Screen 1100 can be presented to a user operating a mobile device, such as mobile device 102, while accessing the QR code management app 505 to scan a QR code native to the QR code management app 505 to allow the user to link the native QR code to an approved third-party app integrated with the QR code management app 505. The native QR code can be an QR code generated directly by the QR code management app 505 and displayed on a screen of the user's mobile device 102, or the native QR code can be a physical QR code, i.e., a sticker printed out and adhered to a piece of equipment or surface on a jobsite.

After logging into the QR code management app 505 through screen 700, the user can scan the native QR code using the native camera app on the mobile device or the user can press the scan QR button displayed on the user interface of the QR code management app 505, such as scan QR button 902 on-screen 900*a* of FIG. 9A. Once the native QR code has been scanned, the user can be presented with screen 1100, which is the MY APPS page in this illustrative embodiment. The screen 1100 shows all the possible apps their company allows. The user can choose the desired app or app and action, which results in the QR code management app 505 launching into the third-party app with the data associated with the QR code passed along to that third-party app. In this example in FIG. 11, the user's MY APPS page has a "FAVORITE" grouping and a "RECENT" grouping of apps. No apps are listed in the "MORE" grouping since all apps already fall in to the previous two categories.

Exemplary Use Case 5

Figure 12:
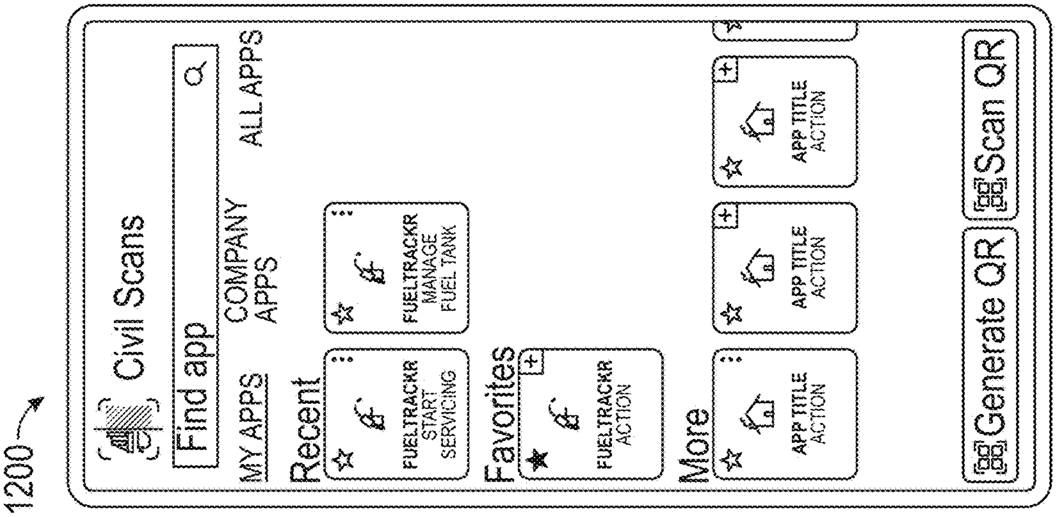
FIG. 12 is an exemplary screen depicting user interaction with a QR code management app for processing QR codes according to another illustrative embodiment.

FIG. 12 depicts an exemplary screen illustrating a user's interaction with the QR code management app 505 in accordance with an illustrative embodiment. Screen 1200 can be presented to a user operating a mobile device, such as mobile device 102, while accessing the QR code management app 505 to scan a QR code that has already been associated with multiple apps and allows the user to select one of the previously associated apps or a different approved app not previously assigned for linking to the QR code.

After logging into the QR code management app 505 through screen 700, the user can scan the native QR code using the native camera app on the mobile device or the user can press the scan QR button displayed on the user interface of the QR code management app 505, such as scan QR button 902 on-screen 900*a* of FIG. 9A. The user can be presented with screen 1200 in FIG. 12 and select an app or an app plus action, or the user can create a new association to other apps or app plus actions their company allows. An app will always be displayed with the "add" indicator as long as the user has not added all the actions for that app to their list.

Exemplary Use Case 6

Figure 13:
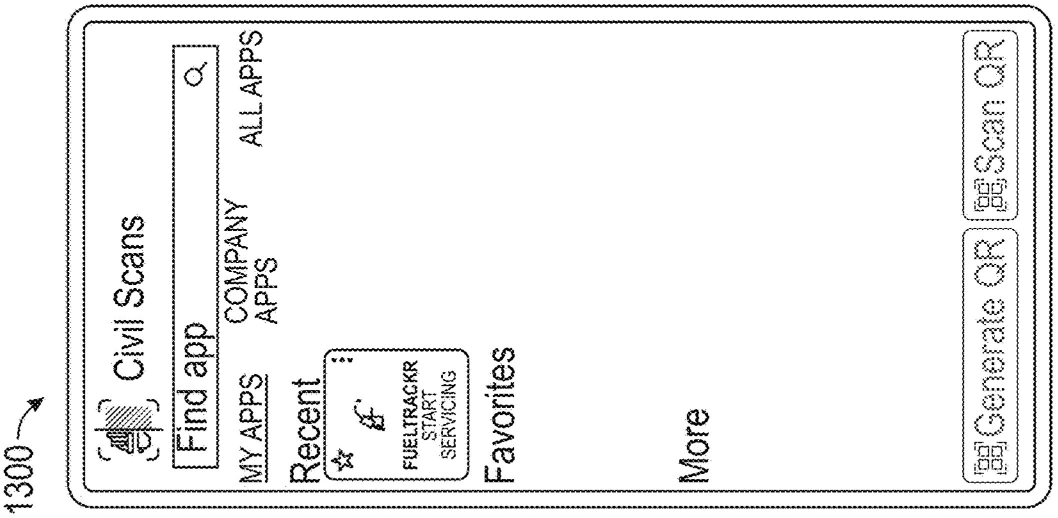
FIG. 13 is an exemplary screen depicting user interaction with a QR code management app for processing QR codes according to another illustrative embodiment.

FIG. 13 depicts an exemplary screen illustrating a user's interaction with the QR code management app 505 in accordance with an illustrative embodiment. Screen 1300 can be presented to a user operating a mobile device, such as mobile device 102, while accessing the QR code management app 505 to scan a QR code with a predefined association with an app managed by the QR code management app 505. In the depicted example, the user has not been authorized to have access to any other apps.

After logging into the QR code management app 505 through screen 700, the user can scan the native QR code using the native camera app on the mobile device or the user can press the scan QR button displayed on the user interface of the QR code management app 505, such as scan QR button 902 on-screen 900*a* of FIG. 9A. Once the native QR code has been scanned, the user can be presented with screen 1300, which is the MY APPS page in this illustrative embodiment. The native QR code has only one association, thus there are no apps listed in the "FAVORITES" grouping or the "MORE" grouping, and the user has no possibility of adding another action for the app.

Exemplary Use Case 7

Figure 14A:
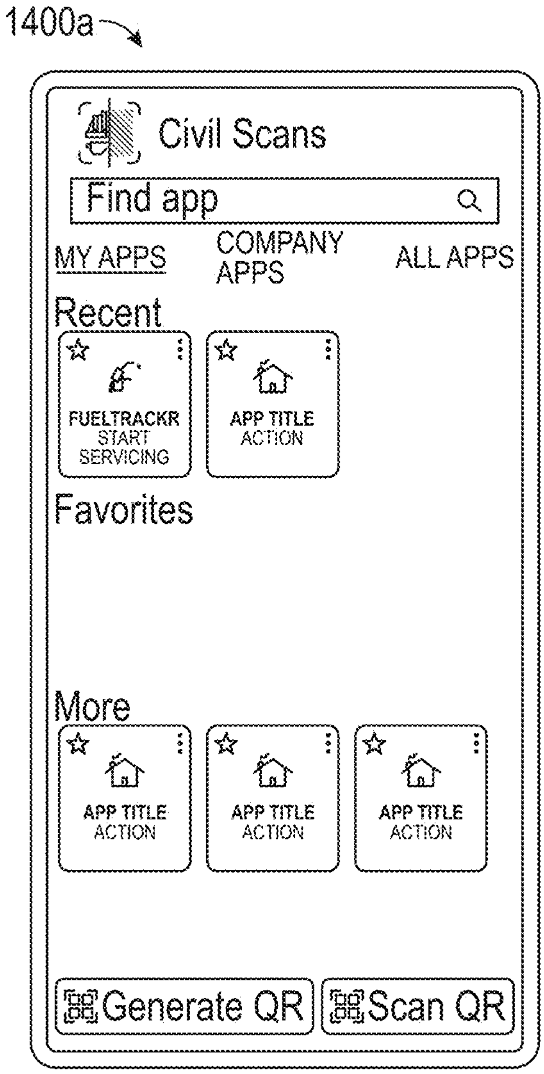
FIGS. 14A-14B are exemplary screens depicting user interaction with a QR code management app for processing QR codes according to another illustrative embodiment.
Figure 14B:
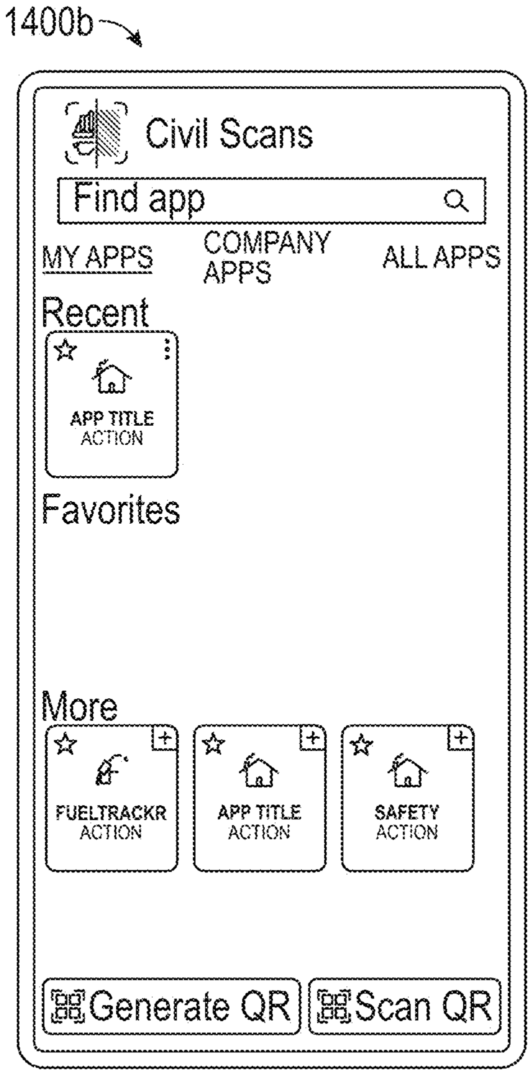

FIGS. 14A and 14B depict exemplary screens illustrating a user's interaction with the QR code management app 505 in accordance with another illustrative embodiment. Screen 1400*a* can be presented to a user operating a mobile device, such as mobile device 102, while accessing the QR code management app 505 to scan any QR code that has already been associated with an app available to the user on the QR code management app 505.

After logging into the QR code management app 505 through screen 700, the user can scan the QR code using the native camera app on the mobile device or the user can press the scan QR button displayed on the user interface of the QR code management app 505, such as scan QR button 902 on-screen 900*a* of FIG. 9A. After scanning the QR code, the user is presented with screen 1400*b*, which shows the list of available apps is filtered to a single app in the "Recent" section that has an association already made. In the "More" section the user could add a new action to the association for that app that is already associated, or they could create a new association, e.g., to the FuelTrackr app.

The QR code management app 505 can also be configured to allow a user to change the display from App list to App-Action list; pull out data such as query strings, route parameters, etc., for use in the UI; maintain an index of "seen" domains/URLs/data to train against or build from; and include in app analytics. The analytics can allow tracking for clicks and/or user location, and collect stats on apps and actions that are used together. The QR code management app 505 can also allow a user to tap a section and move from a carousel to a tile view for sections that have more than 5 apps. Further, the QR code management app could replace QR codes in favor of optical recognition technologies that can uniquely identify a machine, truck, or any other unique item the user would like to associate with a customized output. For example, the presence of stickers (e.g., QR codes) on a vehicle and/or the presence of damage or paint imperfections can form a unique pattern recognizable by the QR code management app that can be used to provide a customized output to a user in place of a QR code.

Figure 15:
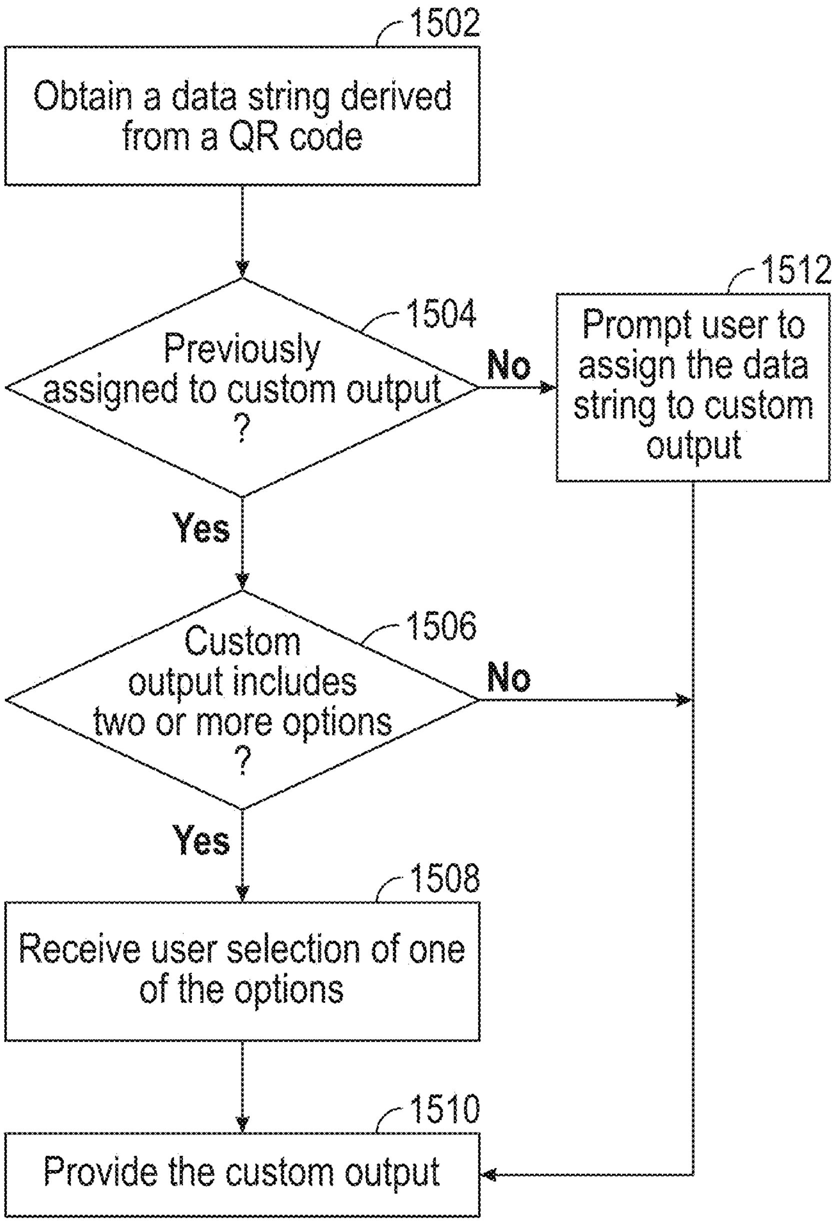
FIG. 15 is a flowchart of steps for processing QR codes according to an illustrative embodiment.

FIG. 15 is a flowchart of steps for processing QR codes according to an illustrative embodiment. The steps of flowchart 1500 can be implemented in a mobile device, such as mobile device 102.

Flowchart 1500 begins at step 1502 by obtaining a data string derived from a QR code. The data string can be obtained from a scan of a QR code or from a QR code that has been transmitted via messaging protocol or that has been saved to memory. The data string can be extracted from the QR code by an application executing on the mobile device, such as QR code management app 505. As previously described, the application can transform the data modules of a QR code matrix into some string of characters, such as text, ASCII, code, binary characters, or any other characters.

In step 1504, a determination is made as to whether the data string has been previously assigned to a custom output. If the data string has been previously assigned to a custom output, then flowchart 1500 proceeds to step 1506 where a determination is made as to whether the custom output includes a list of two or options. If the custom output is a list of two or more options, then a user selection of one of the options is received in step 1508 and then the custom output is provided to the user in step 1510.

Returning back to step 1506, if the custom output does not include a list of two or more custom outputs, i.e., the data string has been assigned to a single custom output, then flowchart 1500 proceeds from step 1506 to step 1510 and provides the custom output to the user.

Returning back to step 1504, if the data string has not been previously assigned to a custom output, then flowchart 1500 proceeds to step 1512 and prompts the user to assign the data string to a customized output and then can optionally proceed to step 1510 and provide the customized output to the user.

Figure 16:
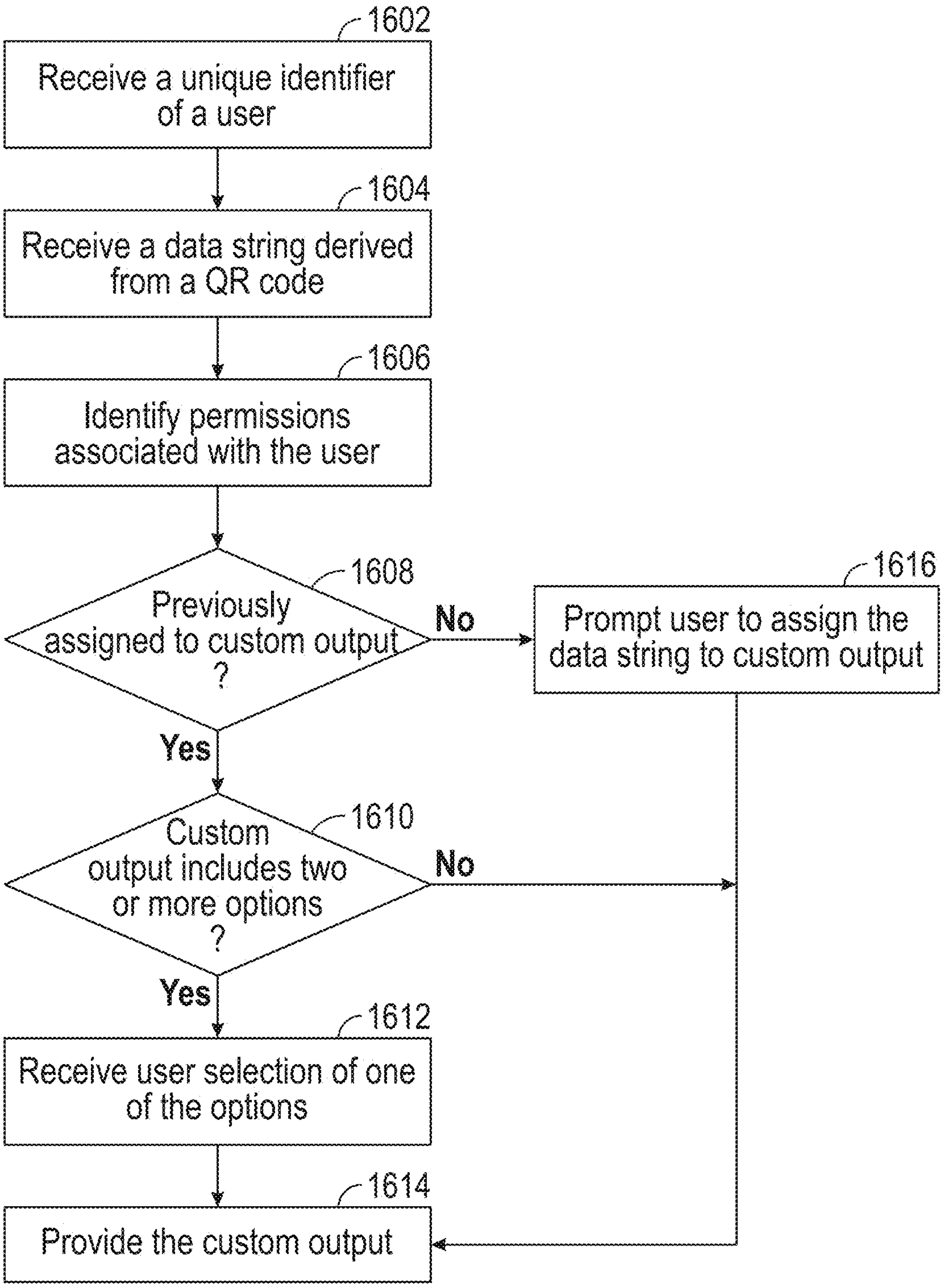
FIG. 16 is a flowchart of steps for processing QR codes according to another illustrative embodiment.

FIG. 16 is a flowchart of steps for processing QR codes according to another illustrative embodiment. The steps of flowchart 1600 can be implemented in a computing device communicating with a mobile device operated by a user, such as a computing device 600.

Flowchart 1600 begins at step 1602 by receiving, from a mobile device, a unique identifier (UID) of a user. In step 1604, a data string derived from a QR code is received from the mobile device. Permissions associated with the user are identified in step 1606. The permissions can be based on the UID.

In step 1608, a determination is made as to whether the data string has been previously assigned to a custom output. If the data string has been previously assigned to a custom output, then another determination is made as to whether the custom output includes a list of two or more custom outputs in step 1610. If the custom output is a list of two or more options, then a user selection of one of the options is received in step 1612 and then the custom output is provided to the user in step 1614.

Returning back to step 1610, if the custom output does not include a list of two or more custom outputs, i.e., the data string has been assigned to a single custom output, then flowchart 1600 proceeds from step 1610 to step 1614 and provides the custom output to the user.

Returning back to step 1608, if the data string has not been previously assigned to a custom output, then flowchart 1600 proceeds to step 1616 and prompts the user to assign the data string to a customized output and then can optionally proceed to step 1614 and provide the customized output to the user.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for managing machine-readable (MR) code processing on a mobile device, the method comprising:

obtaining a data string derived from an MR code that is associated with a pre-determined output, the MR code selected by a non-admin user operating the mobile device;

determining whether the data string was previously assigned from the predetermined output to a custom output by the non-admin user, wherein permission to access the custom output is granted to the non-admin user by an admin user; and in response to determining that the data string was previously assigned to the custom output that the non-admin user has the permission to access, providing the non-admin user with the custom output and an option to reassign the data string to a different custom output that the non-admin user has the permission to access, or in response to determining that the data string was not previously assigned to any custom output, prompting the non-admin user to associate the data string with one or more custom outputs that the non-admin user has the permission to access.

2. The method of claim 1, wherein a creator or an owner of the MR code is a third party.

3. The method of claim 1, wherein obtaining the data string comprises one of scanning the MR code or identifying the MR code in memory for processing into the data string.

4. The method of claim 1, wherein providing the user with the custom output further comprises referencing a data structure linking a unique identifier (UID) of the user and the permission to access.

5. The method of claim 4, wherein:

referencing the data structure further comprises transmitting the data string and the UID to a remote computing device over a network, and the remote computing device determines the permission to access associated with the UID with reference to the data structure.

6. The method of claim 1, wherein providing the user with the custom output further comprises one of launching an app, executing a deep linked action in the app, or providing a list of apps for selection by the user.

7. The method of claim 1, wherein providing the user with the custom output further comprises providing the custom output in response to a determination that the association between the data string and the one or more custom outputs is not expired.

8. The method of claim 1, further comprising:

obtaining a unique identifier (UID) from the user.

9. A method for managing machine-readable (MR) code processing, the method comprising:

receiving, from a mobile device, a unique identifier (UID) of a non-admin user;

receiving, from the mobile device, a data string derived from an MR code that is associated with a predetermined output;

identifying a permission associated with the non-admin user, wherein the permission is based on the UID, and wherein the permission is granted to the non-admin user by an admin user;

determining whether the data string was previously assigned from the predetermined output to a custom output by the non-admin user, wherein the custom output is enabled for the non-admin user by the permission; and in response to determining that the data string was previously assigned to the custom output that the non-admin user is enabled to access by the permission, providing the non-admin user with the custom output, or in response to determining that the data string was not previously assigned to any custom output, receiving from the mobile device a selection associating the data string with one or more custom outputs that the permission allows the non-admin user to access.

10. The method of claim 9, wherein a creator or an owner of the MR code is a third party.

11. The method of claim 9, wherein the data string is obtained from scanning the MR code or identifying the MR code in memory for processing into the data string.

12. The method of claim 9, wherein identifying the permission associated with the user further comprises referencing a data structure linking the UID and the permission.

13. The method of claim 9, wherein the custom output is configured to cause the mobile device to launch an app, execute a deep linked action from the app, or provide a list of apps for selection by the user.

14. The method of claim 9, wherein providing the mobile device with the custom output further comprises providing the custom output in response to a determination that the association between the data string and the one or more custom outputs is not expired.

15. An apparatus comprising:

memory storing instructions; and a processor communicatively coupled to the memory, wherein the processor is configured to execute the instructions to:

obtain a data string derived from an MR code that is associated with a predetermined output, the MR code selected by a non-admin user operating the mobile device;

determine whether the data string was previously assigned to a custom output by the non-admin user, wherein permission to access the custom output is granted to the non-admin user by an admin user; and in response to determining that the data string was previously assigned to the custom output that the non-admin user has the permission to access, providing the non-admin user with the custom output and an option to reassign the data string to a different custom output that the non-admin user has the permission to access, or in response to determining that the data string was not previously assigned to any custom output, prompting the non-admin user to associate the data string with one or more custom outputs that the non-admin user has the permission to access.

16. The apparatus of claim 15, wherein the permissions are identified with reference to a unique identifier (UID) of the user, and wherein the UID is one of a username and password combination, a unique identifier of the mobile device, or user biometrics captured by the mobile device.

17. The apparatus of claim 15, wherein instructions for obtaining the data string comprises additional instructions executable by the processor to scan the MR code or identify the MR code in memory for processing into the data string.

18. The apparatus of claim 15, wherein instructions for providing the user with the custom output further comprises additional instructions executable by the processor to reference a data structure linking a unique identifier (UID) of the user and the permission to access.

19. The apparatus of claim 18, wherein:
instructions for referencing the data structure further comprises additional instructions executable by the processor to transmit the data string and the UID to a remote computing device over a network, and
the remote computing device determines the permission to access associated with the UID with reference to the data structure.

20. The apparatus of claim 15, wherein instructions for providing the user with the custom output further comprises additional instructions executable by the processor to launch an app, execute a deep linked action in the app, or provide a list of apps for selection by the user.

21. The apparatus of claim 15, wherein instructions for providing the user with the custom output further comprises additional instructions executable by the processor to provide the custom output in response to a determination that the association between the data string and the one or more custom outputs is not expired.

22. The apparatus of claim 15, wherein a creator or an owner of the MR code is a third party.

23. An apparatus comprising:
memory storing instructions; and
a processor communicatively coupled to the memory, wherein the processor is configured to execute the instructions to:
receiving, from a mobile device, a unique identifier (UID) of a non-admin user;
receiving, from the mobile device, a data string derived from an MR code that is associated with a predetermined output;
identifying a permission associated with the non-admin user, wherein the permission is based on the UID, and wherein the permission is granted to the non-admin user by an admin user;
determining whether the data string was previously assigned from the predetermined output to a custom output by the non-admin user, wherein the custom output is enabled for the non-admin user by the permission; and
in response to determining that the data string was previously assigned to the custom output that the non-admin user is enabled to access by the permission, providing the non-admin user with the custom output, or
in response to determining that the data string was not previously assigned to any custom output, receiving from the mobile device a selection associating the data string with one or more custom outputs that the permission allows the non-admin user to access.

24. The apparatus of claim 23, wherein a creator or an owner of the MR code is a third party.

25. The apparatus of claim 23, wherein the data string is obtained from scanning the MR code or identifying the MR code in memory for processing into the data string.

26. The apparatus of claim 23, wherein instructions for identifying the permission associated with the user further comprises additional instructions executable by the processor to reference a data structure linking the UID and the permissions.

27. The apparatus of claim 23, wherein the custom output is configured to cause the mobile device to launch an app, execute a deep linked action from the app, or provide a list of apps for selection by the user.

28. The apparatus of claim 23, wherein instructions for providing the mobile device with the custom output further comprises additional instructions executable by the processor to provide the custom output in response to a determination that the association between the data string and the one or more custom outputs is not expired.

* * * * *